United States Patent
Deller et al.

(10) Patent No.: US 7,516,468 B1
(45) Date of Patent: Apr. 7, 2009

(54) INTERACTIVE MEDIA PRESENTATION SYSTEM FOR PRESENTING BUSINESS DATA OVER A DIGITAL TELEVISION NETWORK

(75) Inventors: Andrew David Deller, Bracknell (GB); George Christopher Dawson, Maidenhead (GB); Mathew Huntington, Twickenham (GB)

(73) Assignee: Oracle International Corporation, Redwood Shores, CA (US)

( * ) Notice: Subject to any disclaimer, the term of this patent is extended or adjusted under 35 U.S.C. 154(b) by 887 days.

(21) Appl. No.: 09/976,793

(22) Filed: Oct. 12, 2001

Related U.S. Application Data

(60) Provisional application No. 60/240,131, filed on Oct. 12, 2000.

(51) Int. Cl.
*G06F 13/00* (2006.01)
*G06F 3/00* (2006.01)
*H04N 5/445* (2006.01)

(52) U.S. Cl. ....................................................... 725/40
(58) Field of Classification Search ................... 725/40
See application file for complete search history.

(56) References Cited

U.S. PATENT DOCUMENTS 5,589,892 A * 12/1996 Knee et al. ..................... 725/43
6,173,317 B1 * 1/2001 Chaddha et al. ............. 709/219
6,177,931 B1 * 1/2001 Alexander et al. ............ 725/52
6,473,609 B1 * 10/2002 Schwartz et al. ............ 455/406
6,536,042 B1 * 3/2003 Paul ............................. 725/69
6,615,408 B1 * 9/2003 Kaiser et al. ................. 725/112

* cited by examiner

*Primary Examiner*—Hunter B. Lonsberry
(74) *Attorney, Agent, or Firm*—Townsend and Townsend and Crew LLP

(57) ABSTRACT

The method includes steps for creating and updating an interactive television application, which includes business data and other interactive and dynamic data which changes frequently over time. The interactive television application and data is transmitted over a television broadcast network, and the method includes steps for presenting the data to the user. Business data is compiled into a binary form, the business data for example comprising descriptions of products. A description of an interactive application is generated using an authoring tool. The authoring tool allows a creative designer to create page layouts and use simple script to specify how to respond to user interactions. The compiled business data and the script are streamed to a receiver for generating video information for a user's television, wherein the receiver uses the script to access the compiled business data and generate a presentation of the data for the user. The receiver can be a set-top box for use with a cable television provider, a terrestrial television provider or a satellite television provider. The business data can be compatible with a version of XML (extensible markup language). The business data can be referenced within script created using an authoring tool without the instances of the business data being present at the time of authoring. The compiling can be configured to improve the access speed of the receiver to the business data and to reduce a memory footprint of the business data on the receiver. The business data can be updated and recompiled without requiring the application to be re-authored manually.

29 Claims, 4 Drawing Sheets

INTERACTIVE MEDIA PRESENTATION SYSTEM FOR PRESENTING BUSINESS DATA OVER A DIGITAL TELEVISION NETWORK

This application claims the benefit of commonly assigned provisional application Ser. No. 60/240,131, filed on Oct. 12, 2000, which is incorporated herein in its entirety.

TECHNICAL FIELD

The present invention relates generally to interactive television. More specifically, the present invention pertains to the provision of data and services via interactive television.

BACKGROUND ART

Interactive television is a goal to which many companies within both the entertainment industry and the computer and software industry have devoted much resources and effort. Interactive television generally refers to two-way communications between the TV viewer and one or more service providers. Although various experiments have taken place since the 1990s, interactive TV has yet to reach mass-market status. One early prior art application of interactive TV on a widescale basis is pay TV. A form of this known as Near Video on Demand dedicates an entire channel to the same movie (e.g., shown repetitively) so that the viewer can begin to watch it with reasonably short notice. For example, using a remote control, a user is able to choose a movie to watch, pay for the movie, and begin watching it within an hour or so. The user' interaction is basically choosing which movie to watch.

To implement true interactive television, the presentation of meaningful, interactive and dynamic information and data, providing meaningful and interesting interactive choices to the user, together with traditional television video is desired. In this context, dynamic information and data implies data that is up-to-date, accurate and which changes frequently over time to be of continual interest to the user. Interactive information implies that the user is able to select which items of information to view and/or to respond to or transact with the provider of that information. Example of such data includes news, sports scores, commodity prices, information presented accurately in context of the video and audio broadcasted as a television channel, such as the current product being demonstrated on a home shopping channel, the current question being posed on a game show or options to respond to the current audio-visual commercial being broadcast. Examples of responding and transacting include requesting a brochure on the goods or services presented during a commercial break or to place an order for a product demonstrated on a home shopping channel.

Several proprietary solutions have emerged which provide tools to enable creative designers to create compelling interactive services. The authoring tools provided enable creative designers to produce interactive applications which present data as well as rich media such as high quality video, audio and images.

However, prior art interactive television service creation schemes, such as the various proprietary schemes, suffer from a number of limitations. One such limitation is the fact that business data or other forms of interactive and dynamic data is not easily presented or accessible to users in their homes. This is because the service creation tools of prior art interactive television service creation schemes do not provide the capabilities of an easy-to-use authoring tool whilst allowing business data or other forms of interactive and dynamic data to be updated without manual intervention by the author of the service every time an element of data changes.

Users have become accustomed to rich interactive, and highly dynamic, Web pages, as most users are very familiar with surfing the content of the Internet. Users in many parts of the world have also become accustomed to dynamic Teletext pages containing textual content accessible through their televisions. Prior art interactive television service creation schemes are not able to provide similar types of business data and other interactive and dynamic forms of data as that provided over the Internet or through Teletext. Although the emergence of digital television can provide a means for correcting many of these prior art problems, there currently exists no easy mechanism for the presentation of, and efficient access to, business data and other forms of interactive and dynamic data over a digital television network.

An additional problem is the fact that a typical digital television system uses a "set-top box" receiver for interfacing a user's television set with the digital transmission media (e.g., the satellite dish, the cable, etc.). The set-top boxes are typically a receiver having an embedded processor and one or more tuner components for receiving the digital transmission stream and translating it into a suitable video signal. The video signal is coupled to the standardized inputs of the user's television. The computer resources of a typical set-top box is limited in comparison to the computer resources of a typical desktop computer system. These resource limitations are problematic in providing the rich digital content (e.g., dynamic Web pages, etc.) to which users have become accustomed.

Thus, what is required is a solution for providing easy authoring, updating, presentation of and efficient access to interactive and dynamic business data over a digital TV network. Additionally, the required solution should be compatible with the limited computer resources of a typical set-top box. The present invention provides a novel solution to these requirements.

SUMMARY OF THE INVENTION

The present invention provides a method and system for authoring, updating and providing presentation of interactive and dynamic business data and efficient access to business data over a digital TV network. Embodiments of the present invention provide a solution that delivers rich business data and other forms of interactive and dynamic data content over a digital television network. Additionally, embodiments of the present invention are compatible with the limited computer resources of a typical set-top box.

In one embodiment, the present invention is implemented as a method for authoring interactive television information for transmission over a digital television broadcast, updating the interactive television information being transmitted, and presenting the information to the user. A description of an interactive application is generated using an authoring tool. The authoring tool allows a creative designer to create page layouts and use simple script to specify how to respond to user interactions. Business data, provided by an external system, is compiled into a binary form. As one example, the business data could comprise descriptions of a retailer's products. The compiled business data and interactive application description are streamed to a receiver for generating video information for a user's television, wherein the receiver interprets the authored script to access the compiled business data and generate a presentation of the product descriptions for the user (e.g., via the user's television). The receiver can be a set-top box for use with a cable television provider, a terrestrial television provider or a satellite television provider. The business data can be compatible with a version of XML (extensible markup language).

The business data can be referenced within script created using an authoring tool without the instances of the business data being present at the time of authoring. The compiling of the business data can be configured to improve the access speed of the receiver to the business data. The compiling can also be configured to reduce a memory footprint of the business data on the receiver. The business data can be updated and recompiled without requiring the application to be re-authored manually. A user action, such as the selection of a retailer's product for purchase, can cause data to be transmitted from the receiver to a transaction server via a modem, wherein the transaction server implements a transaction in accordance with the user action.

In a server embodiment, the interactive television method is implemented using a server for transmitting interactive television information over a television broadcast. The server includes a computer system platform for executing software for implementing interactive television functionality. This includes the steps of compiling business data into a binary form, the business data, for example comprising descriptions of products, generating a description of an interactive application comprising script using an authoring tool, and providing the compiled business data and the interactive application description to a set-top box. Video information is then generated for a user's television, wherein the set-top box uses the script to access the compiled business data and generate a presentation of the products for the user.

In a receiver embodiment, the interactive television method is implemented using a set-top box receiver for receiving interactive television information over a television broadcast and providing interactive television to a user. The receiver includes a computer system platform for executing software for implementing interactive television functionality, including the steps of receiving business data compiled into a binary form, the business data for example comprising descriptions of products, receiving a script for accessing the business data, and generating video information for a user's television by using the script to access the compiled business data and generate a television presentation of the products for the user.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
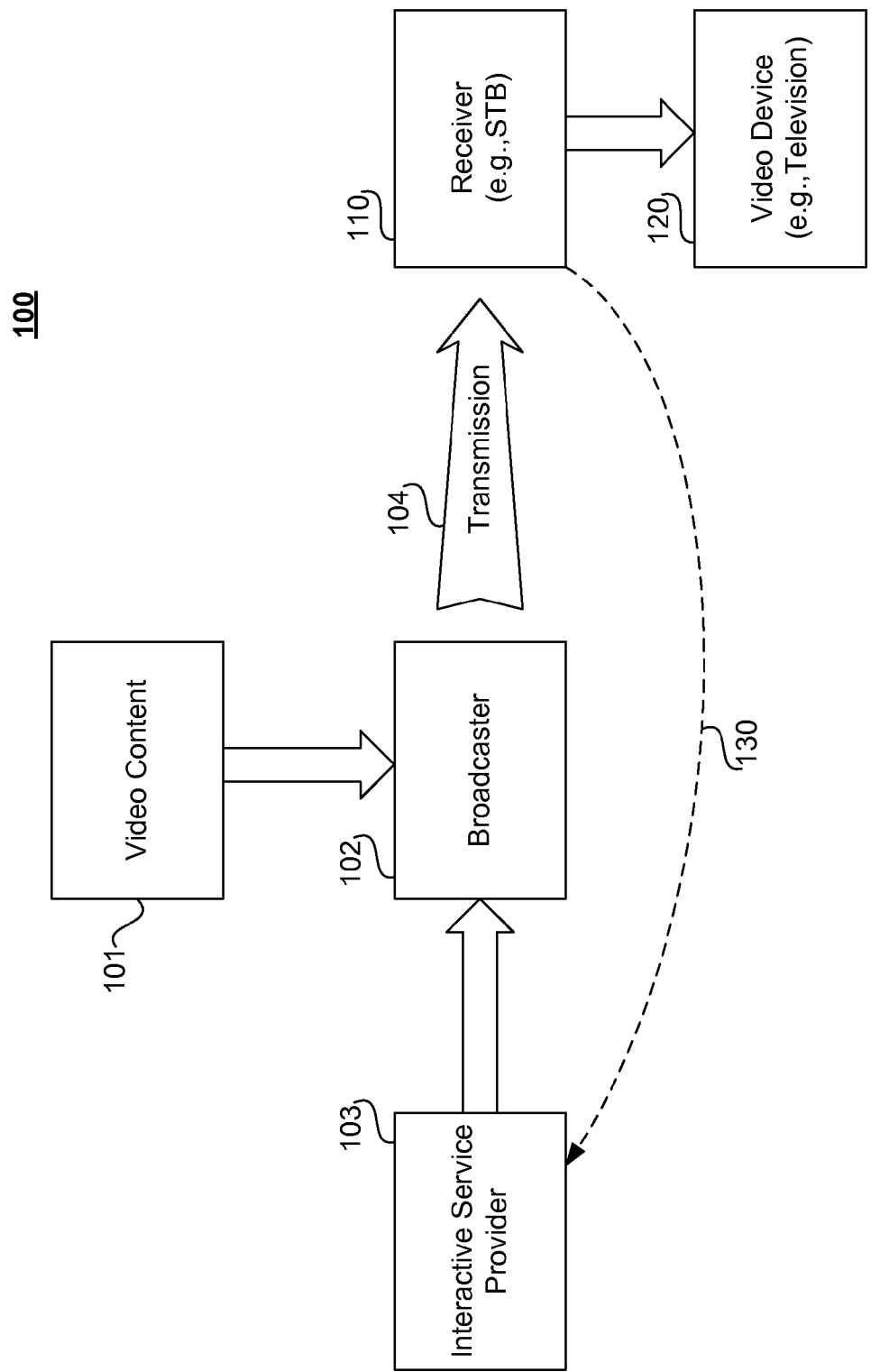
FIG. 1 shows an overview diagram of an interactive television system in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a method and system for authoring, updating and providing presentation of interactive and dynamic business data and efficient access to business data over a digital TV network. Embodiments of the present invention provide a solution that delivers rich business data and other forms of dynamic data content over a digital television network. Additionally, embodiments of the present invention are compatible with the limited computer resources of a typical set-top box. The method and system of the embodiments of the present invention and their benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "computing" or "communicating" or "executing" or "compiling" or "streaming" or the like, refer to the action and processes of a computer system (e.g., computer system 412 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Embodiments

Referring now to FIG. 1, an overview diagram of an interactive television system 100 in accordance with one embodiment of the present invention is shown. As depicted in FIG. 1, system 100 shows a broadcaster 102 coupled to receive video content 101 for transmission through the network broadcasting infrastructure 104 to a plurality of receivers, one such receiver 110 being shown. The receiver 110 receives transmissions 104 from the broadcaster 102 and generates there from a video signal for coupling to a video device 120, which is typically a television.

The interactive functionality of system 100 is provided by an interactive service provider 103. In this embodiment, data for providing interactive business data content to the user (e.g., product information, price lists, advertisements, and the like) is provided by the interactive service provider 103 to the broadcaster 102 for inclusion in the transmission 104. This interactive information is received by the receiver 110 and is used to generate the interactive television experience for the user via the video device 120. A communications link 130 is implemented between the receiver 110 and interactive service provider 103 to provide an upstream communications path from the user to the service provider 103. The communications link 130 can be implemented using, for example, a telephone modem (e.g., a 56 Kbps modem), a cable modem, a DSL modem, or the like.

Referring still to FIG. 1, system 100 the shows the basic components used for providing the presentation and access to business data over a television network. The transmission 104 can be a terrestrial transmission (e.g., television broadcast towers), a satellite transmission, or a cable based transmission. Embodiments of the present invention are described in the context of a digital television network, however an analog television network can also be implemented.

The receiver 110 is typically implemented as a set-top box located near (e.g., on top of) the user's television 120. The receiver 110 receives transmission 104 from the broadcaster 102 and provides the conventional video content (e.g., video content 101) to the television 120. The receiver 110 also receives the digital data from the interactive service provider 103 and provides the interactive functionality. The receiver provides interactive information to the user via the TV screen and speakers of the television 120 and receives the user input from the user via, for example, a remote control device. In one embodiment, the interactive functionality provided by receiver 110 is software based, and is implemented by a computer system platform within receiver 110 (e.g., computer system 412 shown in FIG. 4).

Figure 2:
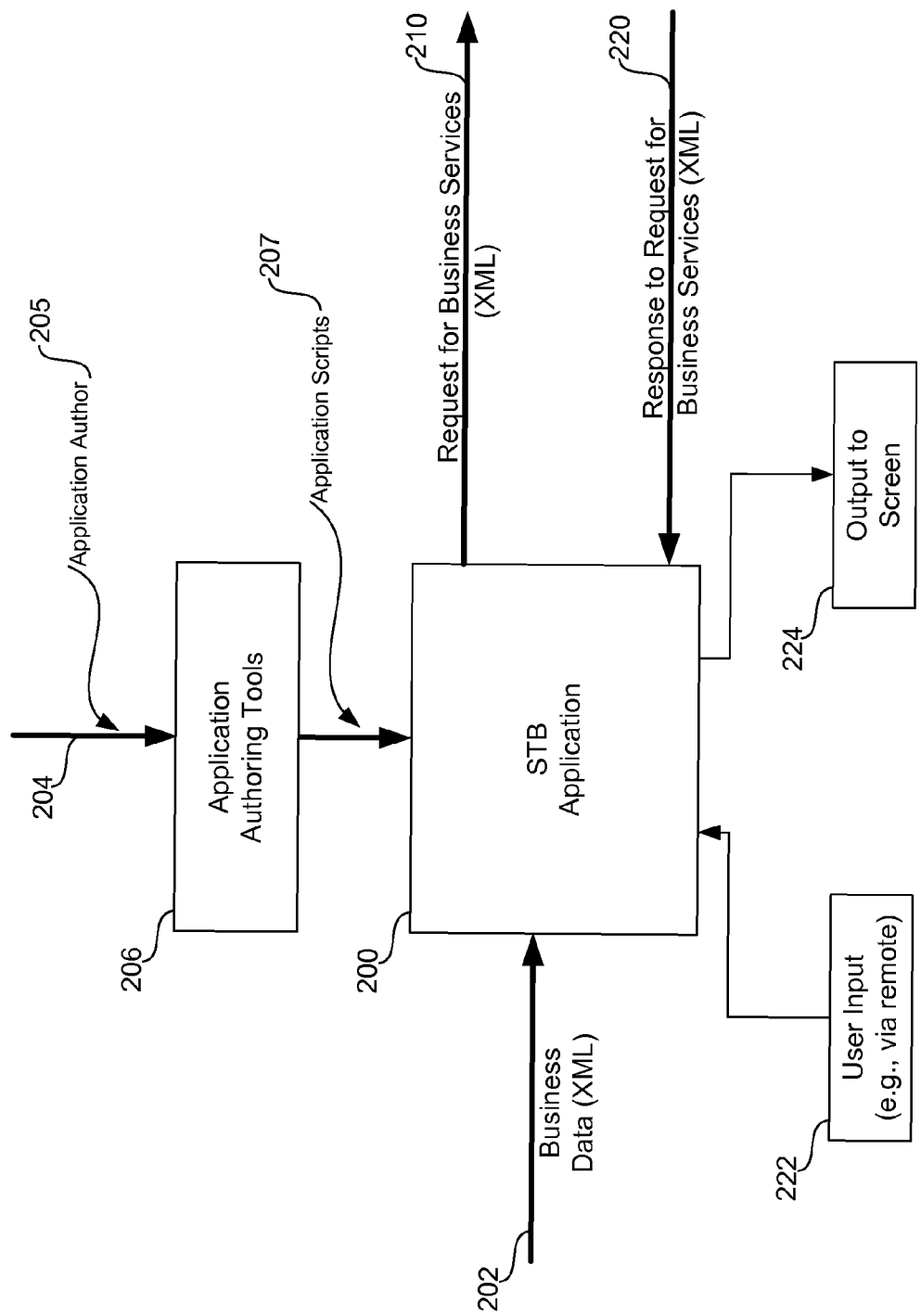
FIG. 2 shows a flow diagram depicting the inputs and outputs of a software based set-top box application executing within a set-top box receiver in accordance with one embodiment of the present invention.

FIG. 2 shows a flow diagram depicting the inputs and outputs of a software based set-top box application executing within a set-top box receiver in accordance with one embodiment of the present invention (e.g., receiver 110).

As depicted in FIG. 2, the set-top box application 200 receives data from the interactive service provider 103 and processes that data in accordance with user input. In this embodiment, XML (extensible markup language) based business data 202 is received via the transmission 104 (shown in FIG. 1). Business data 202 comprises, for example, product descriptions, advertisements, price lists, or other types of dynamic content. Business data 202 is processed in accordance with application scripts 207 to generate an output signal 224 for the video device 120 (shown in FIG. 1). In this embodiment, an application author produces the desired "look and feel" of the graphical presentation seen by the user by using application authoring tools 206. This results in the application scripts 207 which are transmitted to the set-top box application 200 across the transmission 104 along with the business data 202.

In this manner, the graphical presentation generated by the present embodiment and viewed by the user is substantially similar to the hundreds of XML documents many users are accustomed to browsing on the Internet. As is well known, such XML type documents can include video, text, images, and other types of objects.

Once the graphical presentation is seen by the user, user input 222 can be received. The user input can be received through a number of different means, such as, for example, by the user entering choices through manipulation of an on-screen icon (e.g., through menu choices) via a remote control, or from a coupled keyboard (e.g., wirelessly or wired). The user input 222 is used to generate requests for business services 210 (e.g., "I want this product") which is transmitted upstream to the interactive service provider 103 (shown in FIG. 1). The response to the request 220 (e.g., "your order is confirmed") is subsequently transmitted downstream, across transmission 104, back to the set-top box application 200.

In this manner, embodiments of the present invention solve the prior art problems with respect to business data and other forms of interactive and dynamic data being difficult to present to users in their homes. Embodiments of the present invention provide a system for the easy presentation and efficient access to business data over a television network. Embodiments of the present invention utilizes industry standard extensible markup language to provide a mechanism for easy presentation and efficient access to business data over a digital TV network. The embodiments of the present invention takes business data expressed in industry standard XML business data 202 and compiles this into a format which is more suitable for deployment on digital TV networks in terms of size, efficient access and ease of access from interactive applications created using application authoring tools 206. These attributes enable the efficient execution of the set-top box application 200 on the computer system platform of the receiver 110 situated in the user's homes.

Figure 3:
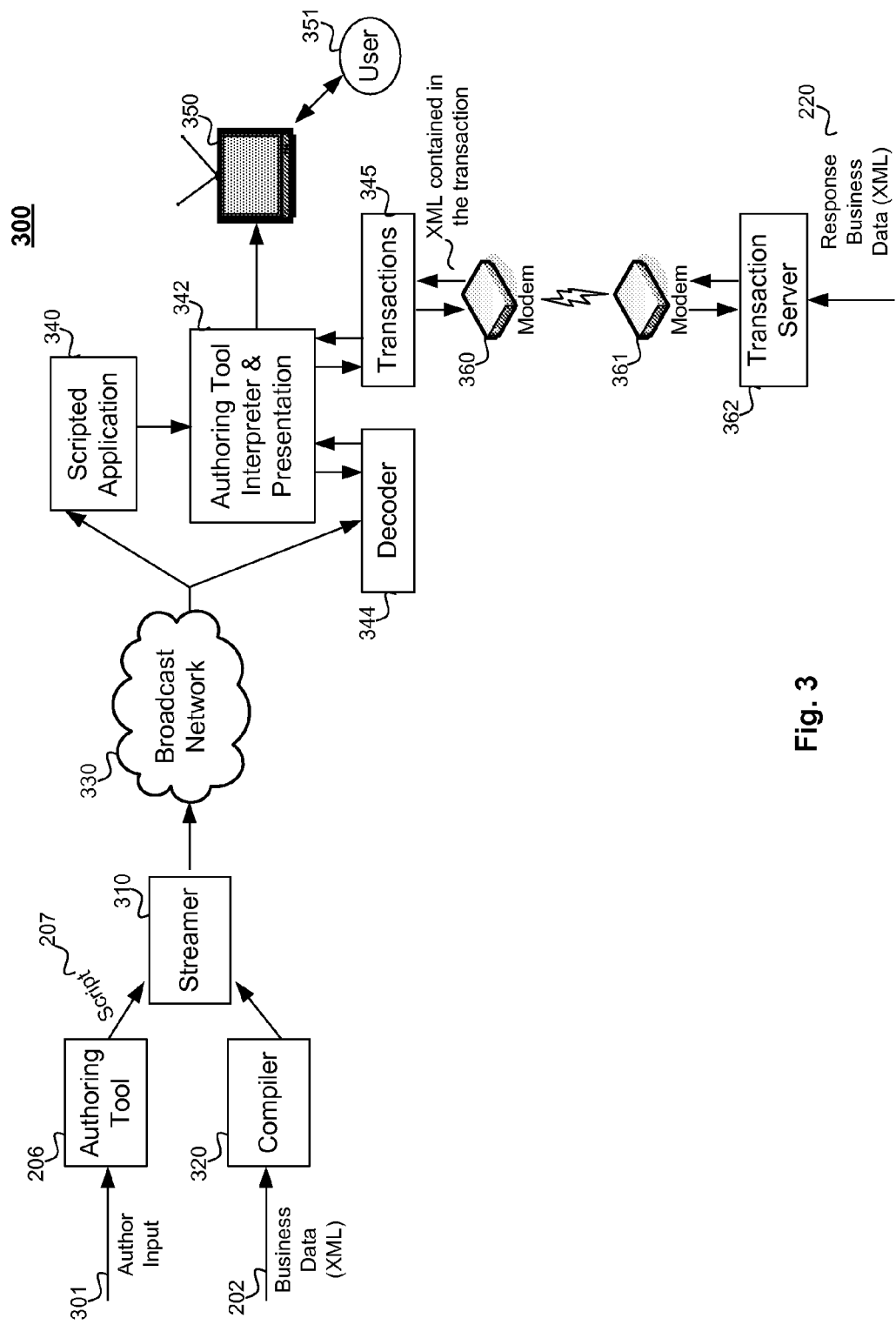
FIG. 3 shows a diagram of an interactive television system in accordance with one embodiment of the present invention.

FIG. 3 shows a diagram of an interactive television system 300 in accordance with one embodiment of the present invention.

System 300, in accordance with embodiments of the present invention, uniquely solves the problem of taking business data 202 expressed in XML and combining this with powerful presentation logic available in STB application authoring tools 206, which cannot normally gain easy access to that data. System 300 functions in part by hiding the complexity of compiling the business data 202 into the broadcast stream and then providing easy access to that data from applications produced using simple to use application authoring tools 206. In this manner, embodiments of the present invention connect businesses with their customers in a straightforward and easily maintainable manner. Embodiments of the present invention essentially expose business data in a convenient form for application authors (e.g., author input 301). Business data 202 in this example can be a list of products, availability, the price of each item, or the like.

Referring still to FIG. 3, when building an application which is to be broadcast, the application author 301, via authoring tools 206, can identify groups of business data 202 which are to be accessible to the user 351 and then refer to groups and individual elements of that business data 202 through a high level scripting. In the example system 300, the product information is built into the broadcast stream using a streamer 310 and the broadcast network 330. The application author deals with elements of the business data 202 according to one or more names allocated by that business rather than, for example, by aliases supplied by embodiments of the present invention. This allows business oriented application authors to create the applications more easily without needing to know how that data becomes accessible to the application. For example, an application author can deal with a product price through the element name "price".

The business data 202 is compiled into a binary form by a compiler 320, providing improved speed of access to individual pieces of data 202 and reduced size, both of which are important for low powered consumer devices. Portions of business data 202 are made available to the scripted applications 340 and discarded when no longer used, reducing overall memory requirements for the targeted set-top box receiver. The compiled business data is utilized by the scripted applications 340, the decoder 344, and the authoring tool application description interpreter and presentation engine 342 to generate the graphical presentation for the user 351 on television 350. For example, a user 351 might select a product displayed on television 350 and then cause a download from the broadcast network 330 of its details. The decoder 344 and components 340 and 342 then provide efficient access to this binary data via a high level scripting language, thus providing the authors access without needing to know the mechanisms by which the data is actually delivered.

Embodiments of the present invention thus allow advanced application authoring decisions to be made on which groups of business data 202 are present on the set-top box receiver at the same time, or allowing early downloading of data. This can improve the perceived speed of the application and consequently enhance the user's experience when using the application. For example an author can ensure that details of the most popular products are already downloaded from broadcast network 330 and ready for display.

In accordance with embodiments of the present invention, once an application has been authored, business data being transmitted from the output of the streamer 310 can be updated. This can be done by recompiling the data into the broadcast stream, thereby eliminating costs involved in re-authoring the application as the data changes. In the context of the system 300, this would involve compiling new lists of products and their details into the broadcast stream.

System 300 also allows online transactions to be performed, in this embodiment, via the transaction engine 345 and modem 360. The transaction itself can be built as XML and tailored for the business systems responsible for dealing with such requests. In turn, responses 220 to a transaction (such as confirmation of an order placed) can pass back business data as XML which is compiled into the same binary format and is consequently readily accessible by the application produced by the application authors via high level scripting and its presentation capabilities. Dynamic data in the form of graphical images is also available to the application authors in the same way as textual data.

It should be noted that functionality of system 300 of the present embodiment is provided at both the transmission end and the receiving end. For example, components 206, 320, and 310 can be implemented within a server on the premises of an interactive television service provider, while components 340, 342, 344, and 345 can be included within the set-top box receiver within the user's home.

Thus, embodiments of the present invention are directed towards a method and system for authoring, updating and providing presentation and efficient access to interactive and dynamic business data over a digital TV network. Embodiments of the present invention provide a solution that delivers rich business data and other forms of dynamic data content over a digital television network. Additionally, embodiments of the present invention are compatible with the limited computer resources of a typical set-top box.

Computer System Platform

Figure 4:
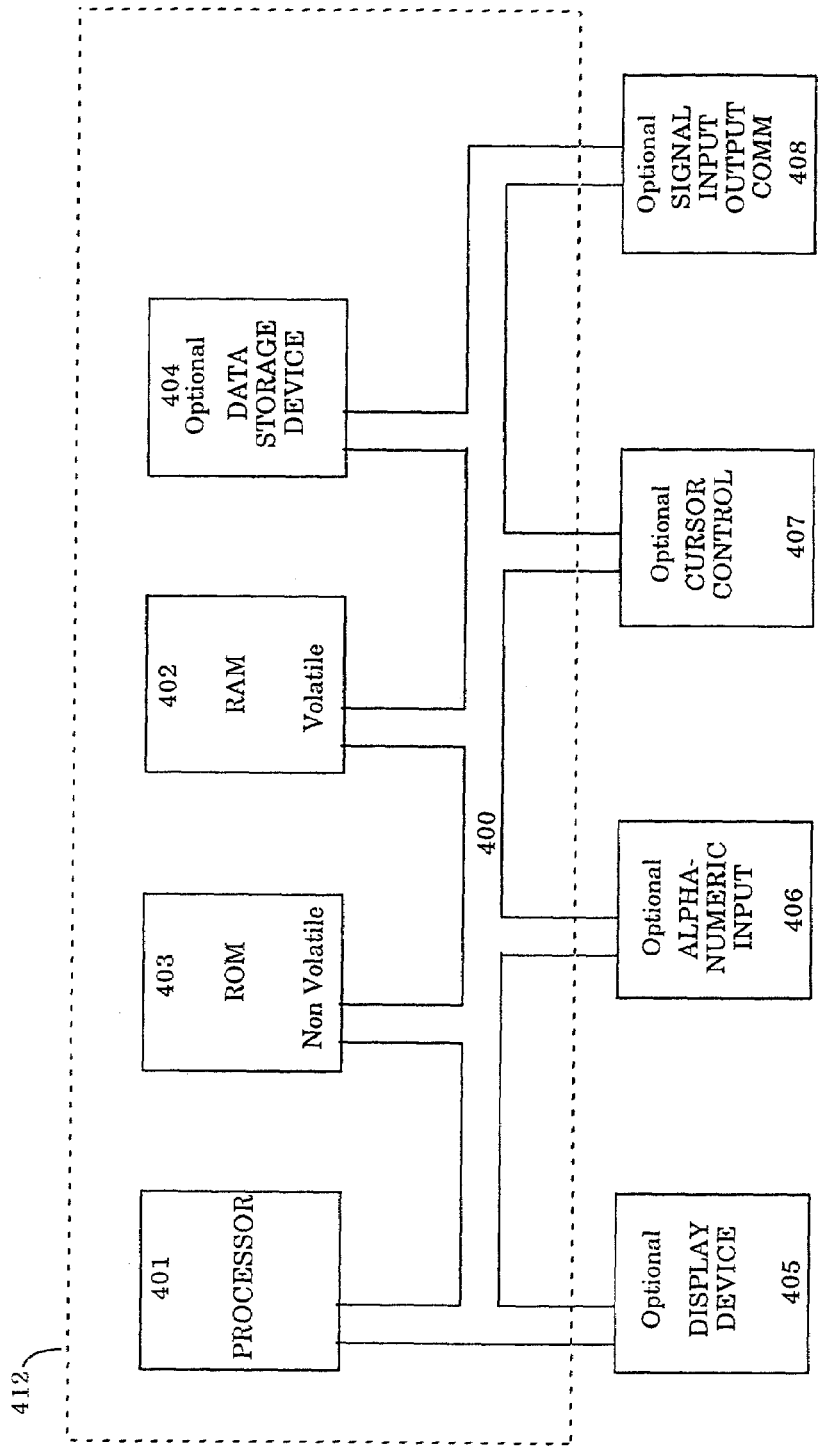
FIG. 4 shows a computer system in accordance with one embodiment of the present invention.

With reference now to FIG. 4, a computer system 412 in accordance with one embodiment of the present invention is shown. Computer system 412 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 412) and are executed by the processor(s) of system 412. When executed, the instructions cause the computer system 412 to implement the functionality of the present invention as described above.

In general, computer system 412 shows the basic components of a computer system used to implement "server" machines and "client" machines. Similarly, computer system 412 shows the basic components of a digital set-top box receiver (e.g., receiver 110 of FIG. 1) that executes software for implementing the functionality of the present invention. Computer system 412 comprises an address/data bus 400 for communicating information, one or more central processors 401 coupled with the bus 400 for processing information and instructions, a computer readable volatile memory unit 402 (e.g., random access memory, static RAM, dynamic, RAM, etc.) coupled with the bus 400 for storing information and instructions for the central processor(s) 401, a computer readable non-volatile memory unit (e.g., read only memory, programmable ROM, flash memory, EPROM, EEPROM, etc.) coupled with the bus 400 for storing static information and instructions for the processor(s) 401. Optionally, system 412 can also include a mass storage computer readable data storage device 404 such as a magnetic or optical disk and disk drive coupled with the bus 400 for storing information and instructions. Optionally, system 412 can include a display device 405 coupled to the bus 400 for displaying information to the computer user, an alphanumeric input device 406 including alphanumeric and function keys coupled to the bus 400 for communicating information and command selections to the central processor(s) 401, a cursor control device 407 coupled to the bus for communicating user input information and command selections to the central processor(s) 401, and a signal generating device 408 coupled to the bus 400 for communicating command selections to the processor(s) 401.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for transmitting interactive television information over a television broadcast, comprising:
   compiling business data into a binary form, the business data comprising descriptions of products, wherein said business data is compiled for use by a set-top box;
   generating a script using a script authoring tool, wherein said compiled business data is processed according to said generated script independent from a further user interaction; and
   transmitting a stream, comprising the compiled business data and the script, to a receiver for generating video information for a user's television, wherein the receiver uses the script to access the compiled business data and generate a presentation of the products for the user.

2. The method of claim 1 wherein the business data is compatible with a version of XML (extensible markup language).

3. The method of claim 1 wherein the compiling of the business data is configured to improve access speed to the business data.

4. The method of claim 1 wherein the compiling of the business data is configured to reduce the size of the business data.

5. The method of claim 1 wherein the receiver is a set-top box.

6. The method of claim 1 wherein the business data is transmitted to the receiver using a modem.

7. A method for receiving interactive television information in a receiver and providing interactive television to a user, comprising:
 receiving a stream comprising a script and a compiled business data in binary form, wherein said business data comprises descriptions of products and wherein said business data is compiled for use by a set-top box;
 processing said compiled business data in binary form according to said script; and
 processing requests within the script, independent from a further user interaction, to map an item of the business data into a position within an authored page template, wherein a video presentation of the business data is presented to the user.

8. The method of claim 7 further including:
 processing a request within the script to map a one or a two-dimensional array of the business data into a named one or two-dimensional array of locations within the authored page template.

9. The method of claim 7 further including:
 processing a request within the script to construct a message containing business data, based on a user action; and
 transmitting the selection to a transaction server, the transaction server for implementing a transaction in accordance with the user action.

10. The method of claim 9 wherein the selection is transmitted from the receiver to the transaction server using a modem.

11. The method of claim 9 wherein the business data is compatible with a version of XML (extensible markup language).

12. The method of claim 7 wherein the business data is compatible with a version of XML (extensible markup language).

13. The method of claim 7 wherein the business data and the script are received over a broadcast network of a cable television provider, a terrestrial television provider or a satellite television provider.

14. A system for transmitting interactive television information over a television broadcast, comprising:
 a server having a processor couple to a memory, the memory having computer readable code which when executed by the processor causes the server to perform a method comprising:
  compiling business data into a binary form, the business data comprising descriptions of products and wherein the business data is compiled for use by a set-top box;
  accessing a script, the script previously generated using a script authoring tool, wherein said compiled business data is processed according to said generated script independent from a further user interaction; and
  transmitting a stream comprising said compiled business data and said script to a set-top box for generating video information for a user's television, wherein the set-top box uses the script to access the compiled business data and generate a presentation of the products for the user.

15. The system of claim 14 wherein the business data is compatible with a version of XML (extensible markup language).

16. The system of claim 14 wherein the compiling of the business data is configured to improve access speed to the business data.

17. The system of claim 14 wherein the compiling of the business data is configured to reduce the size of the business data.

18. The system of claim 14 further including:
 providing the compiled business data and the script to a television broadcaster for inclusion in a television broadcast transmission by the broadcaster.

19. The system of claim 14 wherein the streaming is performed over a broadcast network of a cable television provider, a satellite television provider, or a terrestrial television provider.

20. A system for receiving interactive television information and providing interactive television to a user, comprising:
 a receiver having a processor coupled to a memory, the memory having computer readable code which when executed by the processor causes the receiver to perform a method comprising:
  receiving a stream comprising a script and a compiled business data in binary form, wherein said business data comprises descriptions of products and wherein said business data is compiled for use by a set-top box;
  processing said compiled business data in binary form according to said script; and
  processing requests within a script, independent from a further user interaction, to map an item of the business data into a named position within an authored page template, wherein a video presentation of the business data will be presented to the user.

21. The system of claim 20 further including:
 receiving a selection of one of the product descriptions from the user; and
 transmitting the selection to a transaction server, the transaction server for implementing a transaction in accordance with the selection.

22. The system of claim 21 wherein the selection is transmitted from the receiver to the transaction server using a modem.

23. The system of claim 20 wherein the business data is compatible with a version of XML (extensible markup language).

24. The system of claim 20 wherein the business data and the script are received over a broadcast network of a cable television provider, a terrestrial television provider or a satellite television provider.

25. The system of claim 20 further including:
 processing requests within a script to map an array of the business data into an array of locations within an authored page template, wherein a video presentation of the business data will be presented to the user.

26. The system of claim 20 further including:
 processing a request within a script to construct a message containing the business data, based on a user action; and
 transmitting the selection to a transaction server, the transaction server for implementing a transaction in accordance with the user action.

27. The method as described in claim 1 further comprising:
 providing content download in response to said user interacting with said presentation of said products.

28. The method as described in claim 1, wherein the compiled business data transmitted are updated as data changes by recompiling the business data into the television broadcast, eliminating the need to generate said script.

29. The method as described in claim 1, wherein a portion of the business data is transmitted prior to a need for the portion of business data by the script.

* * * * *

UNITED STATES PATENT AND TRADEMARK OFFICE
CERTIFICATE OF CORRECTION

PATENT NO. : 7,516,468 B1
APPLICATION NO. : 09/976793
DATED : April 7, 2009
INVENTOR(S) : Deller et al.

It is certified that error appears in the above-identified patent and that said Letters Patent is hereby corrected as shown below:

In column 1, line 31, delete "user'" and insert -- user's --, therefor.

Signed and Sealed this

Twenty-fifth Day of May, 2010

David J. Kappos
*Director of the United States Patent and Trademark Office*